United States Patent
Huynh (10) Patent No.: US 9,379,555 B2
(45) Date of Patent: Jun. 28, 2016

(54) ADAPTIVE POWER SOURCE FOR WIRELESS POWER TRANSMITTER

(71) Applicant: Active-Semi, Inc., Road Town, Tortola (VG)

(72) Inventor: Steven Huynh, Fremont, CA (US)

(73) Assignee: Active-Semi, Inc. (VG)

( * ) Notice: Subject to any disclaimer, the term of this patent is extended or adjusted under 35 U.S.C. 154(b) by 247 days.

(21) Appl. No.: 14/266,760

(22) Filed: Apr. 30, 2014

(65) Prior Publication Data
US 2015/0318707 A1 Nov. 5, 2015

(51) Int. Cl.
*H01F 27/42* (2006.01)
*H01F 37/00* (2006.01)
*H01F 38/00* (2006.01)
*H02J 5/00* (2016.01)
*H02J 7/02* (2016.01)

(52) U.S. Cl.
CPC . *H02J 5/00* (2013.01); *H02J 5/005* (2013.01); *H02J 7/02* (2013.01); *H02J 7/025* (2013.01)

(58) Field of Classification Search
USPC .................................................. 307/100–157
See application file for complete search history.

(56) References Cited

U.S. PATENT DOCUMENTS

| | | | | |
|---|---|---|---|---|
| 2010/0277120 A1* | 11/2010 | Cook | ................... | H01Q 19/005 320/108 |
| 2011/0241437 A1* | 10/2011 | Kanno | ..................... | H01F 38/14 307/104 |
| 2012/0161538 A1* | 6/2012 | Kinoshita | ............... | H02J 17/00 307/104 |
| 2014/0113689 A1* | 4/2014 | Lee | ................... | H04W 52/0277 455/573 |
| 2014/0152115 A1* | 6/2014 | Wheeland | ............... | H02J 5/005 307/104 |

* cited by examiner

*Primary Examiner* — Brandon S Cole
(74) *Attorney, Agent, or Firm* — Imperium Patent Works; T. Lester Wallace; Amir V. Adibi

(57) ABSTRACT

A system includes an adaptive power source, a wireless power transmitter, and a wireless power receiver. The adaptive power source supplies a supply voltage across a Universal Serial Bus (USB) connector onto the wireless power transmitter that thereby transmits energy to the wireless power receiver. The wireless power transmitter has a USB plug that is inserted into a USB port of the adaptive power source. The wireless power transmitter sends a power control command to the adaptive power source across the USB connector. The power control command determines the supply voltage to be supplied to the wireless power transmitter. If the wireless power receiver determines the power level should be adjusted, then the wireless power receiver sends a wireless control communication to the wireless power transmitter. The wireless power transmitter reads the wireless control communication and sends a power control command to set the supply voltage to a desired level.

20 Claims, 10 Drawing Sheets

USB TYPE A CONNECTOR EMBODIMENT

USB TYPE A CONNECTOR EMBODIMENT

FIG. 1

PROCESSOR CIRCUIT OF WIRELESS POWER TRANSMITTER

FIG. 2

POWER AMPLIFIER AND OSCILLATOR OF WIRELESS POWER TRANSMITTER

ADAPTIVE POWER SOURCE
FIG. 5

| POWER CONTROL COMMAND INSTRUCTION SET | |
|---|---|
| 0000 | SET VOLTAGE ← 90 |
| 0001 | INCREASE VOLTAGE BY PREDETERMINED INCREMENT ← 91 |
| 0010 | DECREASE VOLTAGE BY PREDETERMINED DECREMENT ← 92 |
| 0011 | MAINTAIN VOLTAGE ← 93 |
| 0100 | DISCONNECT ← 94 |
| 0101 | SET OUTPUT CURRENT LIMIT ← 95 |

USB TYPE B CONNECTOR EMBODIMENT

FIG. 8

DC INPUT SOURCE EMBODIMENT

ADAPTIVE POWER SOURCE FOR WIRELESS POWER TRANSMITTER

TECHNICAL FIELD

The present disclosure relates generally to wireless charging circuits.

BACKGROUND INFORMATION

A wireless charging system includes a wireless power receiver and a wireless power transmitter. The wireless power transmitter is coupled to an input power source. When the wireless power receiver is within close proximity to the wireless power transmitter, the wireless power transmitter and the wireless power receiver are magnetically coupled thereby causing energy to be transferred from the wireless power transmitter to the wireless power receiver. The wireless power receiver uses the received energy to power an external load, such as to power a mobile device or to charge a battery. The amount of the energy that is transferred is typically controlled by wireless communication between the wireless power transmitter and the wireless power receiver. The wireless power transmitter typically includes power supply circuitry that receives a supply voltage from the input power source. A more robust solution is desired.

SUMMARY

A system includes an adaptive power source, a wireless power transmitter, and a wireless power receiver. The adaptive power source receives an AC input supply voltage (for example, 110 VAC or 220 VAC) from an AC input source or DC input supply voltage (for example, 12 VDC) from a DC input source. The adaptive power source supplies a supply voltage V+. The supply voltage V+ is supplied to the wireless power transmitter via a supply voltage conductor, a cable, a power adapter connector, and a power adapter port. In one example, the cable is a universal Serial Bus (USB) cable, the power adapter connector is a USB plug, and the power adapter port is a USB port. The supply voltage conductor may, for example, be a conductor of the Universal Serial Bus (USB) plug. The supply voltage conductor may, for example, be a conductor of the USB cable. The wireless power transmitter receives the supply voltage V+ through the USB port, USB plug, and USB cable, and transmits energy wirelessly to the wireless power receiver.

In one embodiment, the wireless power transmitter has a type A USB plug that is inserted into a type A USB port on the adaptive power source. In another embodiment, the wireless power transmitter has a type B USB plug that is inserted into a type B USB port on the adaptive power source. In yet another embodiment, the wireless power transmitter has a Micro-A type USB plug that is inserted into a Micro-A type USB port on the adaptive power source. In yet another embodiment, the wireless power transmitter has a Micro-B type USB plug that is inserted into a Micro-B type USB port on the adaptive power source. In yet another embodiment, the wireless power transmitter has a Mini-A type USB plug that is inserted into a Mini-A type USB port on the adaptive power source. In yet another embodiment, the wireless power transmitter has a Mini-B type USB plug that is inserted into a Mini-B type USB port on the adaptive power source. In yet another embodiment, the adaptive power source has the USB plug that is inserted into the USB port of the wireless power transmitter. The USB cable is typically part of the device that includes the USB plug, but in some embodiments the USB cable is detachable from both devices.

The wireless power transmitter sends a power control command to the adaptive power source across the standard USB plug, USB port, and USB cable. In one embodiment, the power control command is a multi-bit single-ended digital signal D+/D− sent via two conductors of the standard USB cable. In one another embodiment, the power control command is an analog voltage signal sent via one of the conductors of the standard USB cable. In yet another embodiment, the power control command is a pulse train of high frequency bursts sent via the supply voltage conductor of the standard USB cable. In yet another embodiment, the power control command is a multi-bit digital signal that is communicated across the standard USB cable using differential signaling. The signaling across the USB cable need not be, and typically is not, USB compliant. Employing USB signaling may be undesirably expensive, may involve undesirable licensing and royalty issues, and may be unreliable in certain noisy environments in which the wireless power system is to be operable.

The power control command determines the supply voltage to be supplied to the wireless power transmitter. In one example, the power control command is a command that causes the adaptive power source to increase the supply voltage V+ supplied to the wireless power transmitter. In another example, the power control command is a command that causes the adaptive power source to decrease the supply voltage V+ supplied to the wireless power transmitter. In yet another example, the power control command is a command that causes the adaptive power source to set the supply voltage V+ to a particular voltage level. In yet another example, the power control command is a disconnect command that causes no current to flow from the adaptive power source to the wireless power transmitter. In yet another example, the power control command is a command that causes the adaptive power source to maintain the supply voltage V+ at the same level. In yet another example, the power control command is a command that causes the supply voltage V+ supplied to the wireless power transmitter to change by a predetermined amount. In yet another example, the power control command is a command to change a current or a current limit with which the adaptive power source supplied power to the wireless power transmitter.

In operation of the overall system, if the wireless power receiver determines the power level should be adjusted, then the wireless power receiver sends a wireless control communication to the wireless power transmitter. The wireless control communication may, for example, be communicated using a dedicated wireless link (for example, a Bluetooth wireless link). Alternatively, the wireless control communication may be communicated using the power resonators of the wireless power receiver and the wireless power transmitter. Regardless of the wireless mechanism used to communicate the wireless control communication from the wireless power receives to the wireless power transmitter, a processor circuit of the wireless power transmitter receives and reads (interprets) the wireless control communication and in response sends a power control command to the adaptive power source to set the supply voltage to a desired level. If, for example, the processor reads the wireless control communication and determines that the power level supplied to the wireless power receiver from the adaptive power source is undesirably low, then the processor outputs a power control command that is communicated across the USB cable, the USB plug, and USB port, to the adaptive power source. The power control command causes the adaptive power source to increase the supply voltage V+ supplied back across the USB cable to the wireless power transmitter. If, on the other hand, the processor reads the wireless control communication and determines that the power level supplied to the wireless power receiver is undesirably high, then the processor outputs another power control command. The other power control command causes the adaptive power source to decrease the supply voltage V+ supplied back across the USB cable to the wireless power transmitter. Due to the change in power supplied by the adaptive power source to the wireless power transmitter, the amount of power supplied by the wireless power transmitter to the wireless power receiver is similarly changed.

The foregoing is a summary and thus contains, by necessity, simplifications, generalizations and omissions of detail; consequently is it appreciated that the summary is illustrative only. Still other methods, and structures and details are set forth in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to background examples and some embodiments of the invention, examples of which are illustrated in the accompanying drawings.

Figure 1:
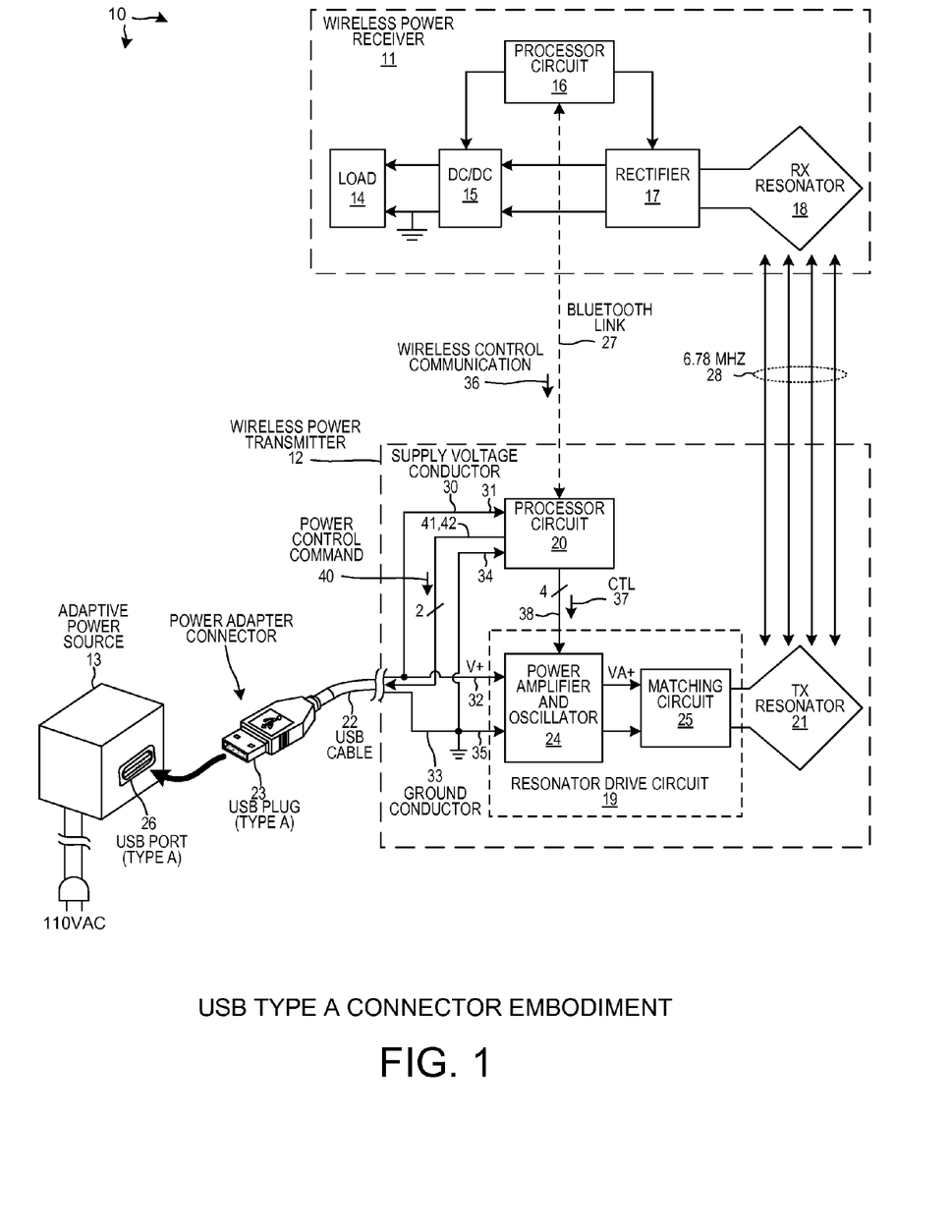
FIG. 1 is a diagram of a system 10 comprising a wireless power receiver 11, a wireless power transmitter 12, and an adaptive power source 13.

FIG. 1 is a diagram of a system 10 comprising a wireless power receiver 11, a wireless power transmitter 12, and an adaptive power source 13. The wireless power receiver 11 comprises a load 14, a Direct Current-to-Direct Current (DC-to-DC) power converter 15, a processor circuit 16, a rectifier 17, and a receiver (RX) resonator 18. The wireless power transmitter 12 comprises a resonator drive circuit 19, a processor circuit 20, a transmitter (TX) resonator 21, a cable 22, and a power adapter connector 23. In this example, the power adapter connector 23 is a Universal Serial Bus (USB) plug 23. The resonator drive circuit 19 includes a power amplifier and oscillator 24, and a matching circuit 25. The adaptive power source 13 comprises a USB port 26. In the system of FIG. 1, the resonators 18 and 21 are loosely coupled. Power transfer occurs at 6.78 MHz and is in compliance with the A4WP Rezence Baseline System Specification (BSS) Version 1.0 (available from Alliance For Wireless Power, 48377 Fremont Blvd. #117, Fremont, Calif. 94538). The amount of power received by the wireless power receiver 11 is not controlled by changing the frequency of the at which the transmitter's resonator 21 is driven nor by changing resonant qualities of the receiver's resonator 18, but rather the amount of power received by the wireless power receiver 11 is controlled by changing the amount of power transmitted by the transmitter without changing the frequency at which the transmitter's resonator 21 is driven.

In operation, the processor circuit 16 of the wireless power receiver 11 communicates with the processor circuit 20 of the wireless power transmitter 12 via a Bluetooth link 27. Reference numeral 28 identifies radio frequency power transmission between the RX resonator 18 and the TX resonator 21. The USB plug 23 is inserted into the USB port 26 of the adaptive power source 13. In this example, the USB plug 23 is a type A USB plug and the USB port 26 is a type A USB plug.

At a first time, the adaptive power source 13 receives a 110 VAC supply voltage from an AC power source such as a wall socket. Adaptive power source 13 supplies a supply voltage V+ onto the supply conductor 30 through USB plug 23 and cable 22. The supply conductor 30 extends from the USB plug 23, through the USB cable 22, and to the input lead 31 of the processor circuit 20. The supply conductor 30 also extends to input lead 32 of the resonator drive circuit 19. A Ground conductor 33 is coupled to the input lead 34 of the processor circuit 20 and to the input lead 35 of the resonator drive circuit 19. The ground conductor 33 is another conductor that extends from the USB plug 23, through USB cable 22, and to the input lead 34 of processor circuit 20 and to the input lead 35 of the power amplifier and oscillator 24. Power amplifier and oscillator 24 receives the supply voltage V+ and drives an increased voltage VA+ onto matching circuit 25 so that a 6.78 MHz power signal 28 is transmitted from the TX resonator 21 to the RX resonator 18. The increased voltage VA+ is directly proportional to the supply voltage V+. Processor circuit 20 controls an output frequency of the power amplifier and oscillator 24 by communicating a multi-bit digital control signal (CTL) 37 via conductors 38.

During power transmission, the processor circuit 16 of the wireless power receiver 11 generates and transmits a wireless control communication 36 across Bluetooth link 27 onto the processor circuit 20 of the wireless power transmitter 12. The wireless control communication 36 indicates whether the wireless power transmitter 12 is to decrease a magnitude of the transmitted power, decrease the magnitude of the transmitted power, set the magnitude of the transmitted power to particular level, or to cease power transmission. For example, if the processor circuit 16 determines that an increase in power consumed by load 14 is desired, then the wireless power receiver 11 generates and transmits a wireless control communication 36 to increase power transmission level of the wireless power transmitter 12. If, on the other hand, the processor circuit 16 determines that a decrease in power consumed by load 14 is desired, then the wireless power receiver 11 generates and transmits a wireless control communication 36 to decrease power transmission level of the wireless power transmitter 12.

The processor circuit 20 of the wireless power transmitter 12 receives the wireless control communication 36. In response to receiving the wireless control communication 36, the processor circuit 20 generates and sends a power control command 40 to the adaptive power source 13. The power control command 40 is sent via conductors 41 and 42, through the USB cable 22, through the USB plug 23, through USB port 26, and onto the adaptive power source 13. The adaptive power source receives and processes the power control command 40.

At a second time, the adaptive power source 13 sets the supply voltage V+ that is supplied onto the supply conductor 30 according to the received power control command 40. In one example, the power control command 40 is a command that causes the adaptive power source to increase the supply voltage V+ supplied onto the supply voltage conductor 30. In another example, the power control command 40 is a command that causes the adaptive power source to decrease the supply voltage V+ supplied onto the supply voltage conductor 30. In yet another example, the power control command 40 is a command that causes the adaptive power source to set the supply voltage V+ supplied onto the supply voltage conductor 30 to a particular voltage level. In yet another example, the power control command 40 is a disconnect command that causes no current to flow through the supply voltage conductor 30. In yet another example, the power control command 40 is a command that causes the adaptive power source to maintain the supply voltage V+ supplied onto the supply voltage conductor 30. In yet another example, the power control command 40 is a command that causes the supply voltage V+ supplied onto the supply voltage conductor 30 to change by a predetermined amount.

Figure 2:
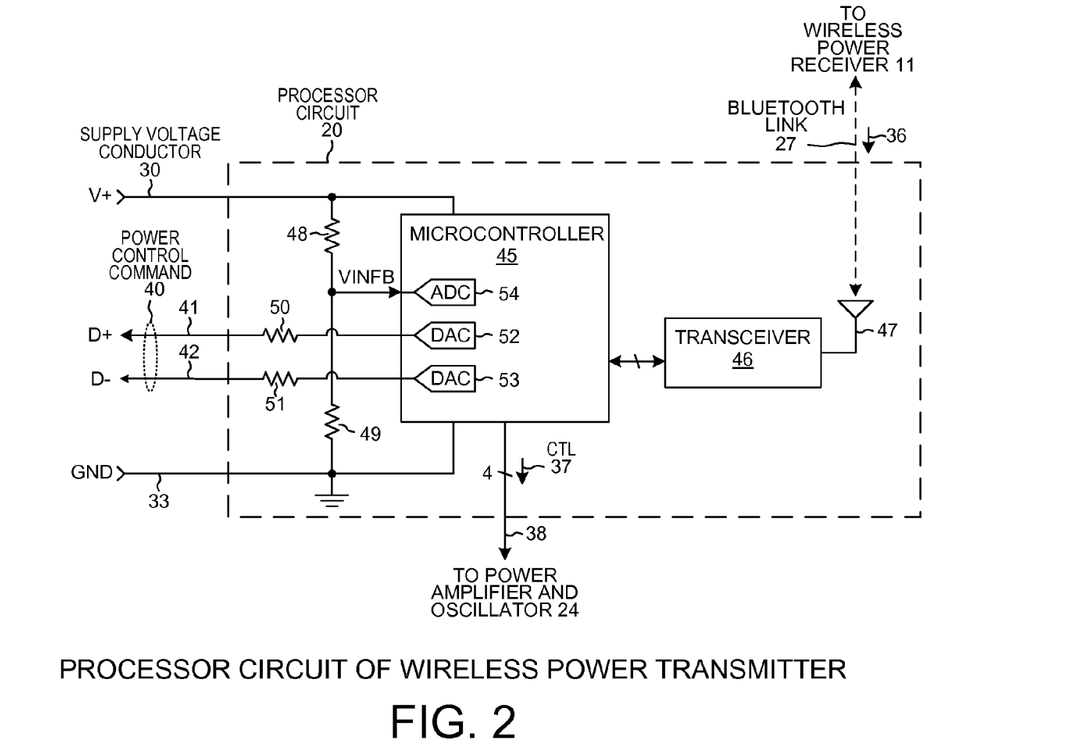
FIG. 2 is a more detailed diagram of the processor circuit 20 of FIG. 1.

FIG. 2 is a more detailed diagram of the processor circuit 20 of FIG. 1. The processor circuit 20 includes a microcontroller 45, a transceiver 46, an antenna 47, a resistor 48, a resistor 49, a resistor 50, and a resistor 51. The microcontroller 45 includes a Digital-to-Analog Converter (DAC) 52, a DAC 53, and an Analog-to-Digital Converter (ADC) 54. The supply voltage V+ is received onto the microcontroller 45 via supply voltage conductor 30. The feedback voltage VINFB is received onto the ADC 54. The microcontroller 45 is grounded via the ground conductor 33.

The microcontroller 45 receives the wireless communication 36 from the wireless power receiver 11 via the transceiver 46 and the antenna 47. The microcontroller 45 processes the received wireless communication 36 and generates multi-bit differential digital signals D+ and D− via DACs 52 and 53. The differential digital signals D+ and D− encode a power control command that is communicated across the conductors 41 and 42. In addition, the microcontroller 45 supplies multi-bit digital control signal CTL 37 to the power amplifier and oscillator 24 via conductors 38.

Figure 3:
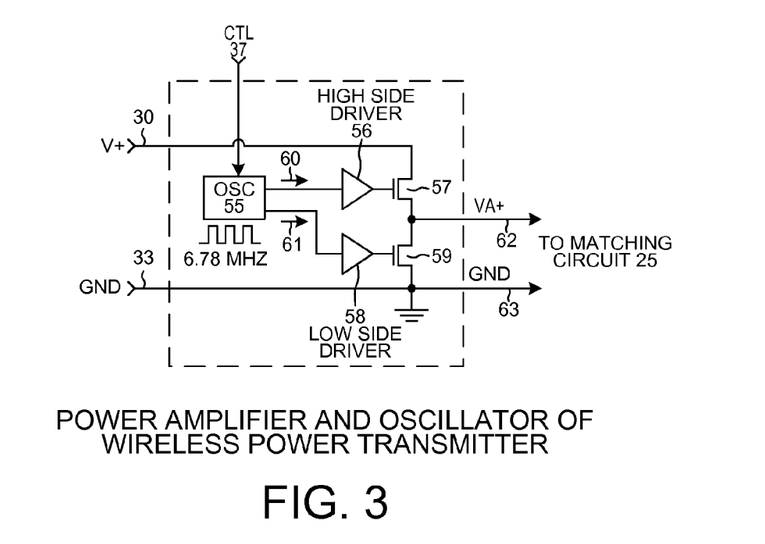
FIG. 3 is a circuit diagram of the power amplifier and oscillator 24 of the resonator drive circuit 19.

FIG. 3 is a circuit diagram of the power amplifier and oscillator 24 of the resonator drive circuit 19. The power amplifier and oscillator 24 comprises an oscillator circuit 55, a high side driver 56, a high side metal-oxide-semiconductor field-effect (MOSFET) transistor 57, a low side driver 58, and a low side MOSFET transistor 59. The oscillator circuit 55 supplies a high side drive signal 60 onto the high side driver 56. The high side driver 56 drives a gate of the high side MOSFET transistor 57. The oscillator circuit 55 supplies a low side drive signal 61 onto the low side driver 58. The low side driver 58 drives a gate of the low side MOSFET transistor 59. The high side MOSFET transistor 57 and the low side MOSFET transistor 59 are controlled to switch in an alternating fashion. The power amplifier and oscillator 24 supplies amplified supply voltage VA+ onto the matching circuit 25 via conductor 62 and ground via conductor 63.

Figure 4:
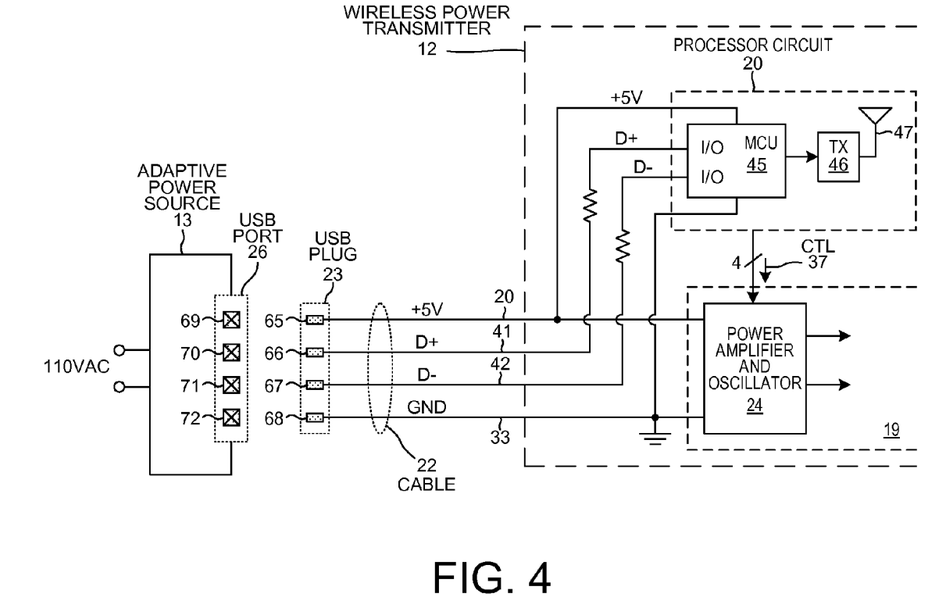
FIG. 4 is a more detailed diagram of how the wireless power transmitter 12 is connected to the adaptive power source 13.

FIG. 4 is a more detailed diagram of how the wireless power transmitter 12 is connected to the adaptive power source 13. The USB plug 23 includes a first terminal 65, a second terminal 66, a third terminal 67, and a fourth terminal 68. Each of the four terminals 65-68 of the USB plug 23 is electrically isolated from each of the other three terminals. The USB port 26 includes a first terminal 69, a second terminal 70, a third terminal 71, and a fourth terminal 72. Each of the four terminals 69-72 of the USB port 26 is electrically isolated from each of the other three terminals. After the USB plug 23 is inserted into the USB port 26, the first terminal 65 is coupled to the first terminal 69, the second terminal 66 is coupled to the second terminal 70, the third terminal 67 is coupled to the third terminal 71, and the fourth terminal 68 is coupled to the fourth terminal 72.

Although the USB plug 23 and cable 22 is a standard USB structure, the wireless power transmitter 12 need not communicate with the adaptive power source 13 via conventional USB communication. Rather the wireless power transmitter 12 is configured to communicate with the adaptive power source 13 via a multi-bit single-ended digital signal via conductors 41 and 42. Alternatively, the wireless power transmitter 12 is configured to communicate with the adaptive power source 13 via a multi-bit differential digital signal via conductors 41 and 42. Alternatively, the wireless power transmitter 12 is configured to communicate with the adaptive power source 13 via an analog voltage signal via one of conductors 20, 41, and 42.

Figure 5:
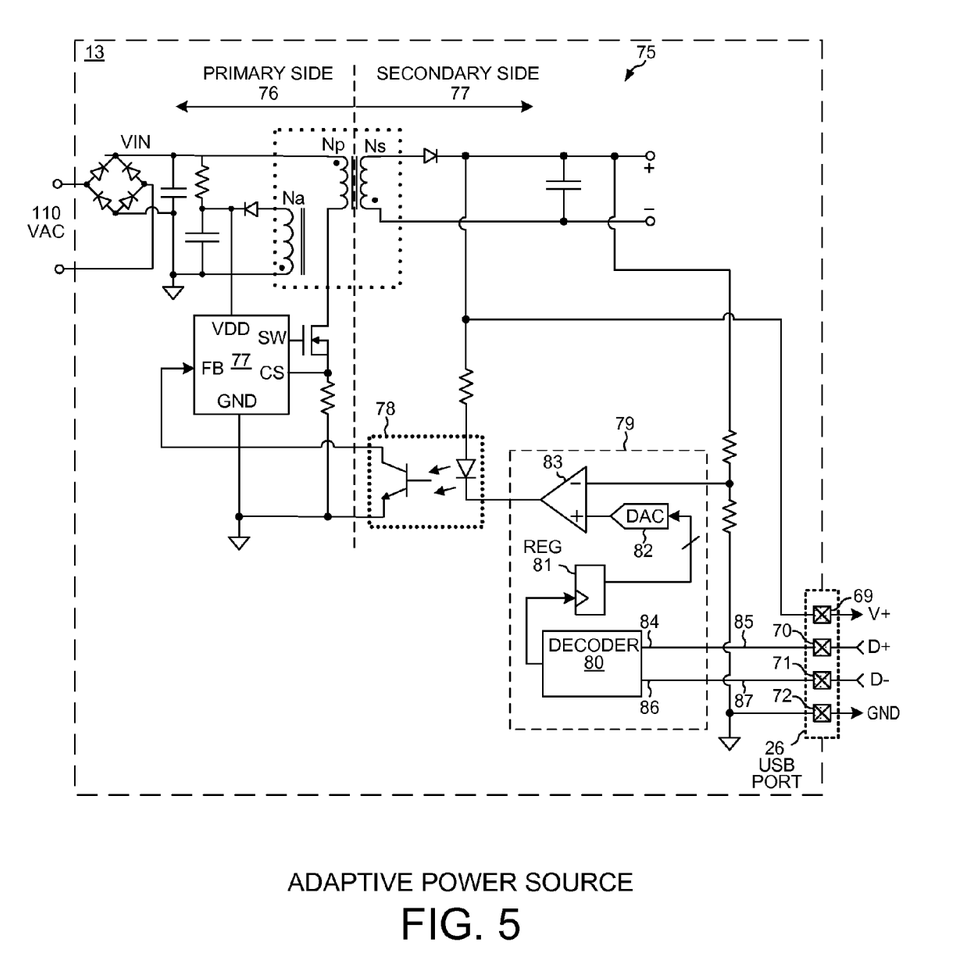
FIG. 5 is a detailed circuit diagram of the adaptive power source 13.

FIG. 5 is a detailed circuit diagram of the adaptive power source 13. The adaptive power source 13 includes a flyback power supply 75 and the USB port 26. The power supply 75 is said to have a "primary side" 76 and a "secondary side" 7 because a controller integrated circuit 77 of the power supply 75 responds to an optocoupler 78 via an integrated circuit 79. The integrated circuit 79 comprises a decoder 80, a register 81, a DAC 82, and a comparator 83. The differential signal D+ is supplied onto a first input lead 84 of the decoder 80 via the second terminal 70 and a conductor 85. The differential signal D− is supplied onto a second input lead 86 of the decoder 80 via the third terminal 71 and a conductor 87. The power supply 75 generates the supply voltage V+ supplied onto the first terminal 69. The wireless power transmitter 12 controls the voltage level of the output supply voltage V+ via differential signals D+ and D−.

Figure 6:
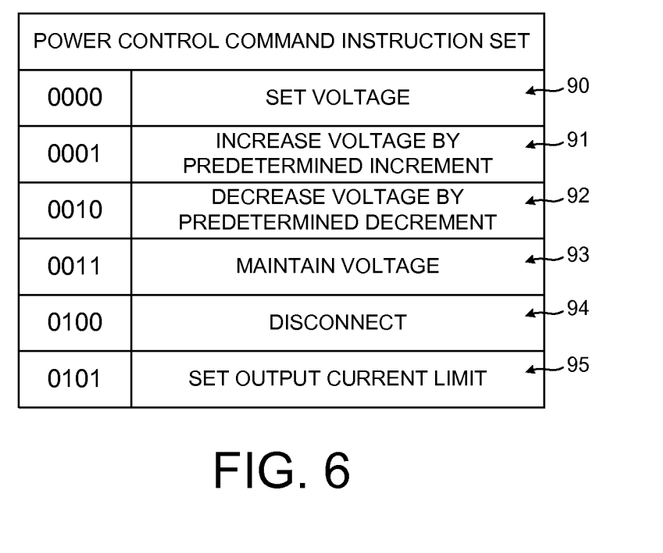
FIG. 6 is a diagram of a power control command instructions set.

FIG. 6 is a diagram of a power control command instructions set. In this example, the power control command is encoded in four-bit digital signal. A power control command 90 sets the voltage output by the wireless power transmitter 12 to a particular voltage level. A power control command 91 increases the voltage output by the wireless power transmitter 12 by a predetermined increment. A power control command 92 decreases the voltage output by the wireless power transmitter 12 by a predetermined decrement. A power control command 93 maintains the voltage output by the wireless power transmitter 12. A power control command 94 sets a current on the supply voltage conductor to zero. A power control command 95 sets an output current limit on a current on the supply voltage conductor.

Figure 7:
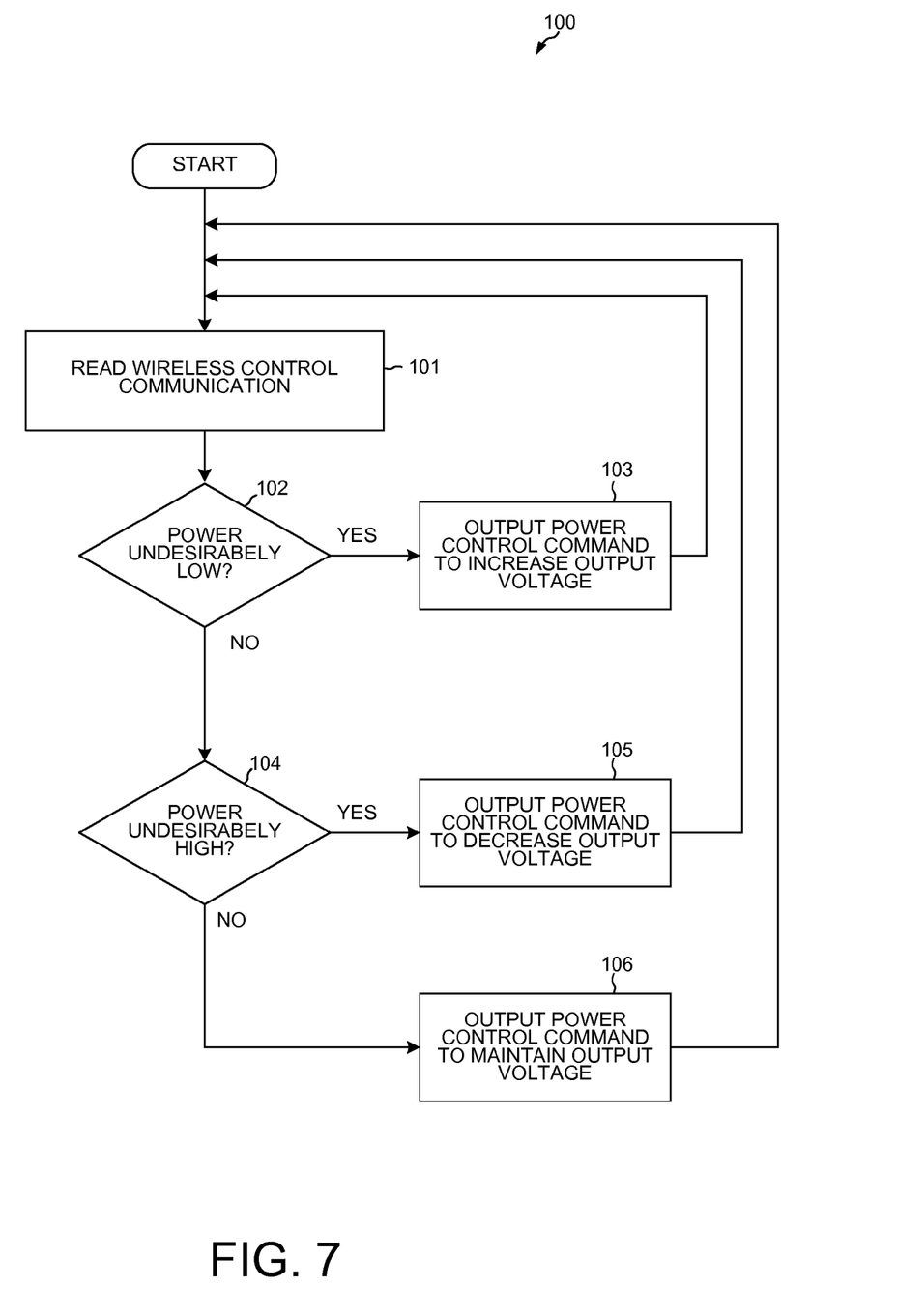
FIG. 7 is a diagram of a flowchart 100 of a method in accordance with at least one novel aspect.

FIG. 7 is a diagram of a flowchart 100 of a method in accordance with at least one novel aspect. In a first step (101), the wireless control communication is read. For example, in FIG. 1, the wireless control communication 36 is communicated across Bluetooth link 27 from the processor circuit 16 of the wireless power receiver 11 onto the processor circuit 20 of the wireless power transmitter 12. The processor circuit 20 reads the wireless control communication 36 to determine the power control command that is to be generated and sent to the adaptive power source 13.

In a second step (step 102), the processor determines whether the power level is undesirably low, and if so, proceeds to a third step (step 103) where the processor outputs a power control command to increase the output voltage of the adaptive power source. For example, in FIG. 1, the processor circuit 20 reads the wireless control communication 36 and determines that the power level supplied to the wireless power receiver 11 is undesirably low. The processor circuit 20 outputs a power control command across conductors 41 and 42, through cable 22, through USB plug 23, and onto the adaptive power source 13 via USB port 26. The power control command causes the adaptive power source to increase the supply voltage V+ supplied onto the supply voltage conductor 30.

If, on the other hand, the processor determines in the second step (102) that the power level is not undesirably low, then in a fourth step (step 104), the processor determines whether the power level is undesirably high. If the processor determines the power level is undesirably high, then in a fifth step (105), the processor outputs a power control command to decrease the output voltage of the adaptive power source. For example, in FIG. 1, the processor circuit 20 reads the wireless control communication 36 and determines that the power level supplied to the wireless power receiver 11 is undesirably low. The processor circuit 20 outputs a power control command across conductors 41 and 42, through cable 22, through USB plug 23, and onto the adaptive power source 13 via USB port 26. The power control command causes the adaptive power source to decrease the supply voltage V+ supplied onto the supply voltage conductor 30.

If, on the other hand, the processor determines in the fourth step (104) that the power level is not undesirably high, then in a sixth step (step 106), the processor outputs a power control command to maintain the output voltage of the adaptive power source. For example, in FIG. 1, the processor circuit 20 reads the wireless control communication 36 and determines that the power level supplied to the wireless power receiver 11 is neither undesirably low nor undesirably high. The processor circuit 20 outputs a power control command across conductors 41 and 42, through cable 22, through USB plug 23, and onto the adaptive power source 13 via USB port 26. The power control command causes the adaptive power source to maintain the supply voltage V+ supplied onto the supply voltage conductor 30.

Figure 8:
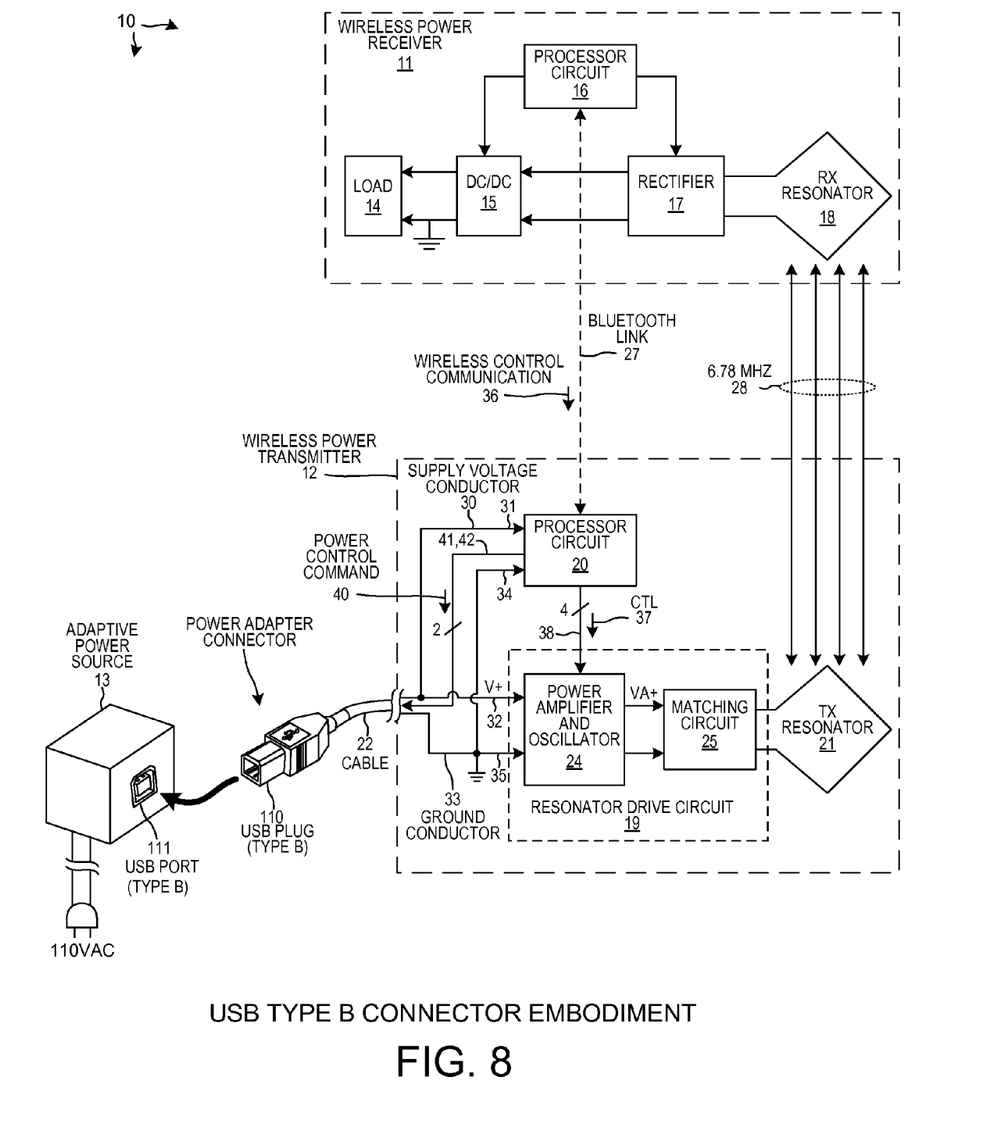
FIG. 8 is a diagram of an alternate embodiment of the system 10.

FIG. 8 is a diagram of an alternate embodiment of the system 10. The system 10 operates in substantially the same way as in FIG. 1, except that the type of USB connectors is of a different type. The wireless power transmitter 200 has a type B USB plug 110 and the adaptive power source 13 has a type B USB port 111.

Figure 9:
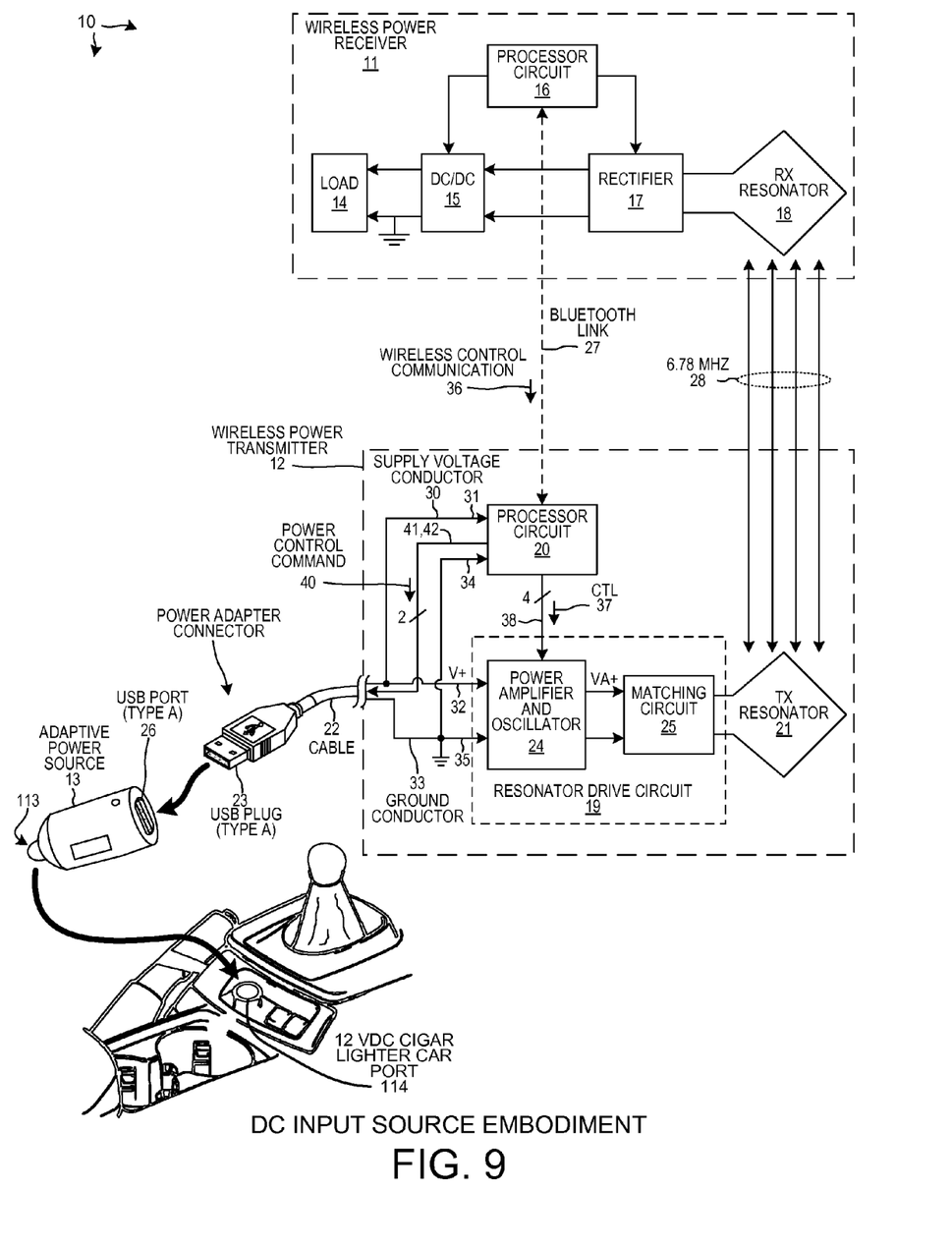
FIG. 9 is a diagram of an alternate embodiment of the system 10.

FIG. 9 is a diagram of an alternate embodiment of the system 10. The system 10 operates in substantially the same way as in FIG. 1, except that the adaptive power source 13 draws power from a DC power source. In this example, an end 113 of the adaptive power source 13 is adapted to plug into a 12 VDC cigar lighter car port 114. The system has type A USB connectors, but could alternatively have type B USB connectors, Mini-A type USB connectors, or Micro-A type USB connectors.

Figure 10:
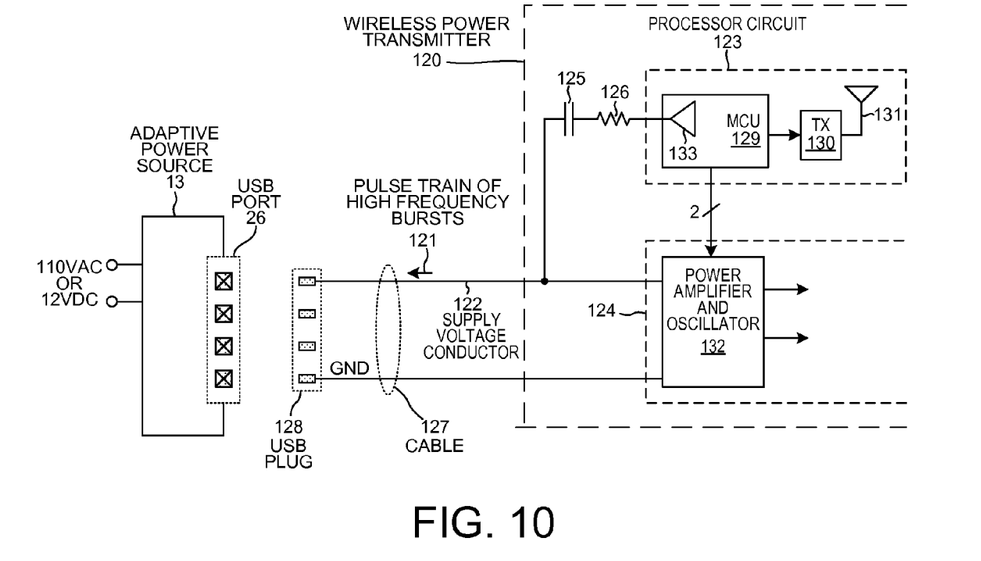
FIG. 10 is an alternate embodiment of a wireless power transmitter 120 that sends a power control command 121 to the adaptive power source 13 by sending a pulse train of high frequency bursts across a supply voltage conductor 122.

FIG. 10 is an alternate embodiment of a wireless power transmitter 120 that sends a power control command 121 to the adaptive power source 13 by sending a pulse train of high frequency bursts across a supply voltage conductor 122. The wireless power transmitter 120 includes a processor circuit 123, a resonator drive circuit 124, a capacitor 125, a resistor 126, a USB cable 127, a USB plug 128, and a resonator (not shown). The processor circuit 123 comprises a microcontroller 129, a transceiver 130, and an antenna 131. The microcontroller 129 includes a driver buffer 133 coupled to a lead of resistor 126. The resonator drive circuit 124 comprises a power amplifier and oscillator 132 and a matching circuit (not shown). The resonator drive circuit 124 operates in substantially the same way as the resonator drive circuit 19 of FIG. 1.

Figure 11:
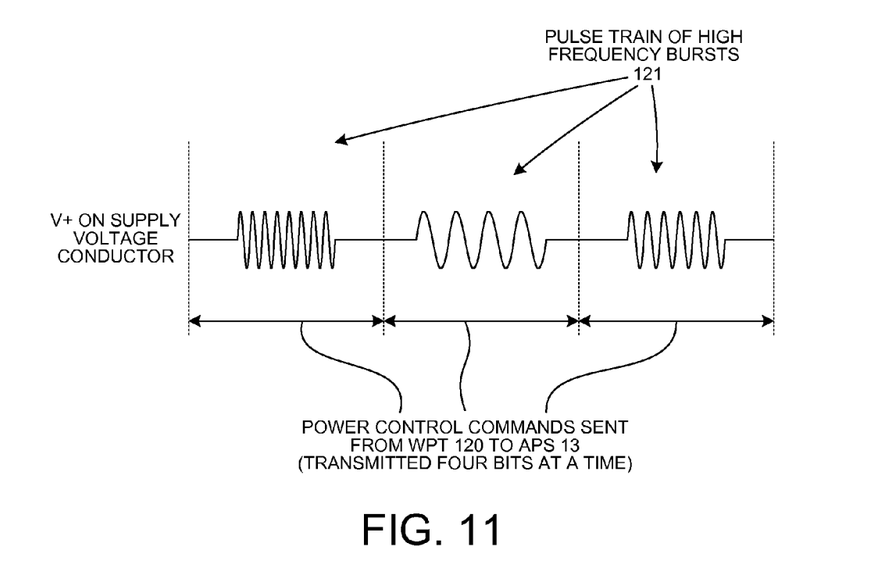
FIG. 11 is a waveform diagram of the pulse train of high frequency bursts 121 that encodes the power control commands.

FIG. 11 is a waveform diagram of the pulse train of high frequency bursts 121 that encodes the power control commands. Each pulse encodes a four-bit power control command.

Figure 12:
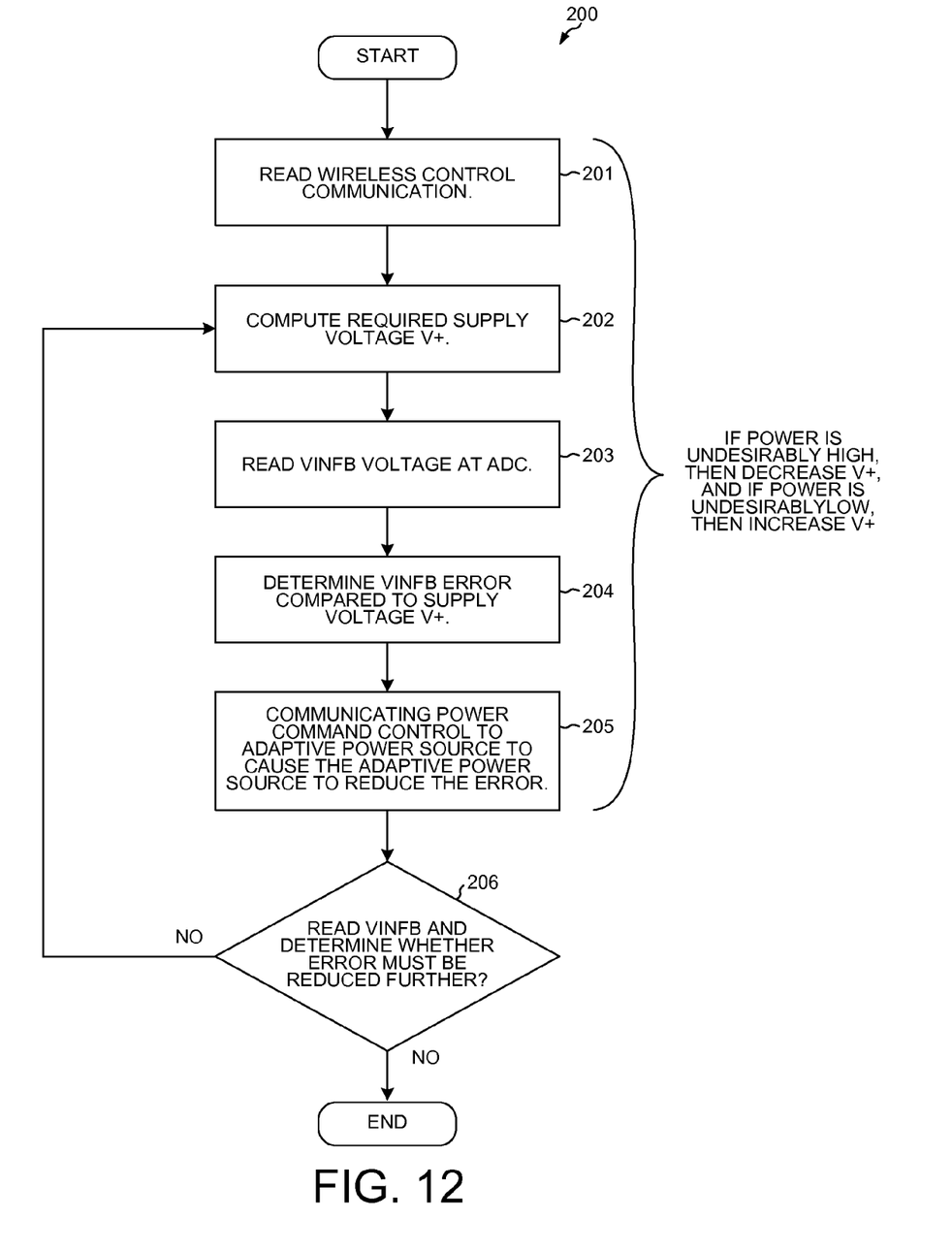
FIG. 12 is a flowchart of a method 200 in accordance with another novel aspect.

FIG. 12 is a flowchart of a method 200 in accordance with another novel aspect. In a first step (201), the wireless control communication is read. For example, in FIG. 1, the wireless control communication 36 is communicated across Bluetooth link 27 from the processor circuit 16 of the wireless power receiver 11 onto the processor circuit 20 of the wireless power transmitter 12. The processor circuit 20 reads the wireless control communication 36 to determine the power control command that is to be generated and sent to the adaptive power source 13.

In a second step (step 202), the processor computes the required supply voltage V+ the adaptive power source is to supply to the wireless power transmitter. For example, in FIG. 1, the processor circuit 20 reads the wireless control communication 36 and determines the voltage level at which the supply voltage V+ is to be set.

In a third step (step 203), the processor reads the feedback voltage VINFB at the ADC. For example, in FIG. 2, the ADC 54 of the microcontroller 45 receives the feedback voltage VINFB.

In a fourth step (step 204), the processor determines the VINFB error as compared to the supply voltage V+. For example, in FIG. 2, the microcontroller 45 determines the feedback voltage VINFB error.

In a fifth step (step 205), the processor communicates a power command control to the adaptive power source to cause the adaptive power source to reduce the error. For example, in FIG. 1, the processor circuit 20 outputs a power control command across conductors 41 and 42, through cable 22, through USB plug 23, and onto the adaptive power source 13 via USB port 26.

In a fifth step (step 206), the processor reads the feedback voltage VINFB at the ADC and determines whether the error must be reduced further. If the processor determines the error is to be further reduced, then the processor computes the required supply voltage V+ at step 202.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A method comprising:
   (a) at a first time receiving a voltage onto a wireless power transmitter, wherein the voltage is a voltage on a supply voltage conductor, and wherein the voltage is received from an adaptive power source, through a power adapter connector, through a cable, and onto the wireless power transmitter;

(b) receiving a wireless control communication from a wireless power receiver onto the wireless power transmitter;

(c) in response to the wireless control communication sending a power control command from the wireless power transmitter, through the cable, through the power adapter connector, and to the adaptive power source, wherein the power control command is a command to change the voltage on the supply voltage conductor; and (d) at a second time receiving onto the wireless power transmitter the voltage on the supply voltage conductor, wherein the voltage on the supply voltage conductor in (d) is different than the voltage on the supply voltage conductor in (a).

2. The method of claim 1, wherein the power control command sent in (c) is a command to the adaptive power source to increase the voltage on the supply voltage conductor, and wherein the voltage on the supply voltage conductor in (d) is larger than the voltage on the supply voltage conductor in (a).

3. The method of claim 1, wherein the power control command is a command to the adaptive power source to decrease the voltage on the supply voltage conductor, and wherein the voltage on the supply voltage conductor in (d) is smaller than the voltage on the supply voltage conductor in (a).

4. The method of claim 1, wherein the power control command is a command to the adaptive power source to set the voltage on the supply voltage conductor to a particular voltage, and wherein the voltage on the supply voltage conductor in (d) is the particular voltage.

5. The method of claim 1, wherein at the first time in (a) a current is flowing through the supply voltage conductor, wherein the power control command is a disconnect command to the adaptive power source, and wherein at the second time in (d) no current is flowing through the supply voltage conductor.

6. The method of claim 1, further comprising:

(e) sending a second power control command from the wireless power transmitter, through the cable, through the power adapter connector, and to the adaptive power source, wherein the power control command is a command to the adaptive power source to maintain the voltage on the supply voltage conductor at whatever voltage the voltage on the supply conductor was at the time the second power control command was received.

7. The method of claim 1, further comprising:

(e) sending a second power control command from the wireless power transmitter, through the cable, through the power adapter connector, and to the adaptive power source, wherein the power control command is a command to the adaptive power source to set a current limit of a current, wherein the current is a current flowing through the supply voltage conductor.

8. The method of claim 1, wherein the power control command is a command to the adaptive power source to change the voltage on the supply voltage conductor by a predetermined amount.

9. The method of claim 1, wherein the power adapter connector is a plug taken from the group consisting of: a type A USB (Universal Serial Bus) plug, a type B USB (Universal Serial Bus) plug, a Mini-A type USB (Universal Serial Bus) plug, a Mini-B type USB (Universal Serial Bus) plug, a Micro-A type USB (Universal Serial Bus) plug, and a Micro-B type USB (Universal Serial Bus) plug.

10. The method of claim 1, wherein the power control command is communicated as a signal taken from the group consisting of: a multi-bit single-ended digital signal, an analog voltage signal, a multi-bit differential digital signal.

11. A wireless power transmitter for transmitting power to a wireless power receiver, the wireless power transmitter comprising:

a resonator;

a resonator drive circuit coupled to the resonator;

a supply voltage conductor, wherein at a first time a voltage is present on the supply voltage conductor, wherein the wireless power transmitter is powered by the voltage received onto the supply voltage conductor;

a ground conductor; and a processor that receives a wireless control communication from the wireless power receiver and in response causes a power control command to be sent out of the wireless power transmitter, wherein the power control command is a command to change the voltage on the supply voltage conductor, and wherein the power control command causes the voltage on the supply voltage conductor to change such that the voltage on the supply voltage conductor at a second time is different than the voltage on the supply voltage conductor at the first time.

12. The wireless power transmitter of claim 11, wherein the power control command is a command to increase the voltage on the supply voltage conductor, and wherein the voltage on the supply voltage conductor at the second time is larger than the voltage on the supply voltage conductor at the first time.

13. The wireless power transmitter of claim 11, wherein the power control command is a command to decrease the voltage on the supply voltage conductor, and wherein the voltage on the supply voltage conductor in (d) is smaller than the voltage on the supply voltage conductor in (a).

14. A wireless power transmitter for transmitting power to a wireless power receiver, the wireless power transmitter comprising:

a resonator;

a resonator drive circuit coupled to the resonator;

a supply voltage conductor, wherein the wireless power transmitter is powered via the supply voltage conductor;

a ground conductor; and means for receiving a wireless control communication from the wireless power receiver and in response causing a power control command to be sent out of the wireless power transmitter, wherein the power control command is a command to change one of a voltage magnitude of a voltage received onto the wireless power transmitter via the supply voltage conductor or a current limit magnitude of a current received on the wireless power transmitter via the supply voltage conductor.

15. The wireless power transmitter of claim 14, wherein the means is a digital processor circuit comprising a microcontroller, a transceiver, and an antenna.

16. The wireless power transmitter of claim 14, wherein the power control command is a command to increase the magnitude of the voltage on the supply voltage conductor.

17. The wireless power transmitter of claim 14, wherein the power control command is a command to decrease the magnitude of the voltage on the supply voltage conductor.

18. The wireless power transmitter of claim 14, wherein the means comprises a USB (Universal Serial Bus) plug, and wherein the supply voltage conductor and the ground conductor are conductors of the USB plug.

19. The wireless power transmitter of claim 14, wherein the means comprises a USB (Universal Serial Bus) port, and wherein the supply voltage conductor and the ground conductor are conductors of the USB port.

20. The wireless power transmitter of claim 14, wherein the power control command is taken from the group consisting of: a multi-bit digital signal communicated from the wireless power transmitter as one or more single-ended digital signals, an analog signal communicated from the wireless power transmitter as one or more analog signals, and a multi-bit digital signal communicated from the wireless power transmitter using differential signaling.

* * * * *